(12) United States Patent
Kawarasaki

(10) Patent No.: US 7,200,482 B2
(45) Date of Patent: Apr. 3, 2007

(54) DRIVE CONTROL APPARATUS AND METHOD AND TWO-WHEELED VEHICLE

(75) Inventor: Yoshihiro Kawarasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 491 days.

(21) Appl. No.: 10/743,943

(22) Filed: Dec. 24, 2003

(65) Prior Publication Data

US 2004/0178008 A1    Sep. 16, 2004

(30) Foreign Application Priority Data

Dec. 27, 2002    (JP)    ............................ P2002-379901

(51) Int. Cl.
*B60T 7/12*    (2006.01)
(52) U.S. Cl. ........................... 701/97; 477/906; 701/93; 701/51
(58) Field of Classification Search .................. 701/97, 701/110, 114, 71, 76, 93, 51; 180/170, 218, 180/7.1, 21; 318/3, 55; 477/906
See application file for complete search history.

(56) References Cited

U.S. PATENT DOCUMENTS

| | | | | |
|---|---|---|---|---|
| 5,701,965 | A * | 12/1997 | Kamen et al. | 180/7.1 |
| 5,917,248 | A * | 6/1999 | Seguchi et al. | 290/31 |
| 6,018,694 | A * | 1/2000 | Egami et al. | 701/102 |
| 6,125,321 | A * | 9/2000 | Tabata et al. | 701/97 |
| 6,178,372 | B1 * | 1/2001 | Tabata et al. | 701/97 |
| 6,302,230 | B1 * | 10/2001 | Kamen et al. | 180/171 |
| 6,362,536 | B1 * | 3/2002 | Izumiura et al. | 290/40 C |
| 6,554,088 | B2 * | 4/2003 | Severinsky et al. | 180/65.2 |
| 6,571,892 | B2 * | 6/2003 | Kamen et al. | 180/8.2 |
| 6,651,766 | B2 * | 11/2003 | Kamen et al. | 180/218 |
| 2001/0032743 | A1 * | 10/2001 | Kamen et al. | 180/7.1 |
| 2002/0121394 | A1 * | 9/2002 | Kamen et al. | 180/41 |
| 2003/0156930 | A1 * | 8/2003 | Ahedo, Jr. | 414/462 |
| 2006/0066287 | A1 * | 3/2006 | Obayashi et al. | 322/25 |

OTHER PUBLICATIONS

Unknown, Systems and equipment guide for certification of part 23 airplanes, ACE-100, Jun. 27, 2002.*
Unknown, Goonyella system information pack, issue 2, Jun. 2005.*
Tom Harris, How Segways Work, printed on Sep. 14, 2006 from http://travel.howstuffworks.com/ginger.htm/printable.*
Unknown author, Serious transportation designed for the world, printed on Sep. 14, 2006 from http://www.segway.com/solutions/.*

* cited by examiner

*Primary Examiner*—Cuong Nguyen
(74) *Attorney, Agent, or Firm*—Oblon, Spivak, McClelland, Maier & Neustadt, P.C.

(57) ABSTRACT

A drive control apparatus able to hold an autonomously stabilized posture by a small size configuration by independently detecting abnormalities in a drive system of a first motor and a drive system of a second motor at controllers, outputting the results to majority decision circuits, and having the majority decision circuits turn switches on/off by majority decision based on the results.

8 Claims, 5 Drawing Sheets

DRIVE CONTROL APPARATUS AND METHOD AND TWO-WHEELED VEHICLE

BACKGROUND OF THE INVENTION

1. Field of the Invention

The present invention relates to a drive control apparatus and method for controlling the drive of a two-wheeled vehicle and to a two-wheeled vehicle using that drive control apparatus.

2. Description of the Related Art

A two-wheeled vehicle carrying a rider is known. Such a two-wheeled vehicle autonomously, stably remains upright when the drive action of the wheels is normally controlled. For example, Japanese Unexamined Patent Publication (Kokai) No. 1-316810 discloses a two-wheeled vehicle provided with auxiliary wheels assisting the wheels when impaired in autonomous stability.

If providing auxiliary wheels to a two-wheeled vehicle, however, there are the problems that the two-wheeled vehicle ends up becoming larger in size and the auxiliary wheels impair the mobility of the two-wheeled vehicle when running in an autonomously stabilized state.

SUMMARY OF THE INVENTION

An object of the present invention is to provide a drive control apparatus and method able to hold a vehicle in an autonomously stabilized posture by a small sized configuration and a two-wheeled vehicle using the same.

According to a first aspect of the invention, there is provided a drive control apparatus for controlling a drive means for driving motion of a vehicle, having an abnormality detecting means for detecting an operational abnormality of the drive means by an odd number of at least three independent systems, a majority decision means for deciding if there is an abnormality in the drive means by majority decision based on detection results of detection of an operational abnormality by the abnormality detecting means by the odd number of systems, and a drive stopping means for stopping the drive action by the drive means when it is judged by the majority decision means that there is an abnormality in the drive means.

The action of the drive control apparatus of the first aspect of the invention is as follows.

The abnormality detecting means detects an operational abnormality of the drive means by an odd number of at least three independent systems.

Next, the majority decision means judges if there is an abnormality in the drive means by majority decision based on detection results of detection of an operational abnormality by the abnormality detecting means by the odd number of systems.

Next, the drive stopping means stops the drive action by the drive means when the majority decision means judges that there is an abnormality in the drive means.

According to a second aspect of the invention, there is provided a drive control apparatus for controlling a first drive means for driving a first wheel of a vehicle having a first wheel and second wheel rotating about shafts orthogonal to a direction of progression and a second drive means for driving the second wheel, having an abnormality detecting means for detecting operational abnormalities of the first drive means and the second drive means by an odd number of at least three independent systems, a majority decision means for detecting abnormalities in the first drive means and the second drive means by majority decision based on detection results of detection of operational abnormalities by the abnormality detecting means by the odd number of systems, and a drive stopping means for stopping the drive action of a wheel by the drive means for which an abnormality is detected by the majority decision means among the first drive means and the second drive means.

The action of the drive control apparatus of the second aspect of the invention is as follows.

The abnormality detecting means detects operational abnormalities of the first drive means and second drive means by an odd number of at least three independent systems.

Next, the majority decision means detects abnormalities in the first drive means and second drive means by majority decision based on detection results of detection of operational abnormalities by the abnormality detecting means by the odd number of systems.

Next, the drive stopping means stops the drive action of the wheels by the drive means for which an abnormality is detected by the majority decision means among the first drive means and the second drive means.

In the drive control apparatus of the second aspect of the invention, preferably the first drive means and the second drive means generate a first drive signal for driving the first wheel and a second drive signal for driving the second wheel based on the state of the vehicle or an instruction, the drive control apparatus further has a third drive means for generating a third drive signal for judgment of abnormalities corresponding to the first drive signal and the second drive signal based on the state of the vehicle or an instruction, and the abnormality detecting means detects operational abnormalities of the first drive means and the second drive means based on matching of the first drive signal, the second drive signal, and the third drive signal at each of the independent systems.

Further, in the drive control apparatus of the second aspect of the invention, preferably the first drive means and the second drive means generate the first drive signal and the second drive signal so that a designated difference corresponding to a rotational speed of the vehicle arises in the drive forces given to the first wheel and the second wheel, and the abnormality detecting means detects operational abnormalities in the first drive means and the second drive means based on coincidence and noncoincidence between the first drive signal and the second drive signal minus the effects due to the difference and the third drive signal.

According to a third aspect of the invention, there is provided a two-wheeled vehicle having a first wheel and a second wheel rotating about an axis orthogonal to a direction of progression, a first drive means for driving the first wheel, a second drive means for driving the second wheel, an abnormality detecting means for detecting operational abnormalities of the first drive means and the second drive means by an odd number of at least three independent systems, a majority decision means for detecting abnormalities in the first drive means and the second drive means by majority decision based on detection results of detection of operational abnormalities by the abnormality detecting means by the odd number of systems, and a drive stopping means for stopping the drive action of the wheel by the drive means for which an abnormality is detected by the majority decision means among the first drive means and the second drive means.

According to a fourth aspect of the invention, there is provided a drive control method for controlling a drive means for driving motion of a vehicle having a first step of detecting an operating abnormality of the drive means by an odd number of at least three independent systems, a second step of judging the presence of an abnormality of the drive means by majority decision based on detection results of detection of an operational abnormality by the odd number of systems at the first step, and a third step of stopping the drive action by the drive means when it is judged that there is an abnormality in the drive means at the second step.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

First, a two-wheeled vehicle according to an embodiment of the present invention will be explained.

Figures 1A, 1B:
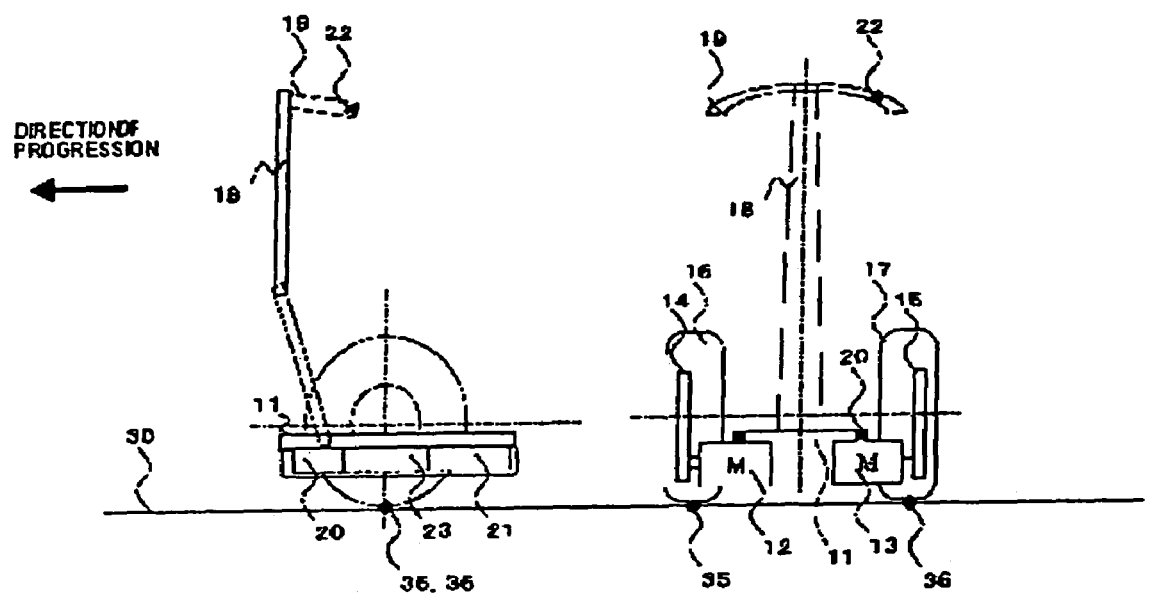
FIGS. 1A and 1B are views of the configuration of a two-wheeled vehicle according to an embodiment of the present invention.

FIGS. 1A and 1B are views of the configuration of a two-wheeled vehicle 10 according to the present embodiment.

FIG. 1A is a view of the configuration seen from the side, while FIG. 1B is a view of the configuration seen from the front.

As shown in FIG. 1, a two-wheeled vehicle 10 for example has a step board 11, a first motor 12, a second motor 13, a first transmission mechanism 14, a second transmission mechanism 15, a first wheel 16, a second wheel 17, a stay 18, a handle 19, a sensor group 20, a battery 21, an alarm unit 22, and a drive unit 23.

The two-wheeled vehicle 10 is characterized by detection of an abnormality in the drive unit 23 and control of the drive action based on the results.

Here, the drive unit 22 corresponds to the drive control apparatus of the present invention, the first wheel 16 corresponds to the first wheel of the present invention, and the second wheel 17 corresponds to the second wheel of the present invention.

A rider places both feet on the step board 11 for example when getting on the vehicle.

The first motor 12 and the second motor 13 are power units using for example winding coils.

The first motor 12 generates a rotational force based on a first drive signal from the drive unit 23 and transmits it through the first transmission mechanism 14 to the first wheel 16.

The second motor 13 generates a rotational force based on a second drive signal from the drive unit 23 and transmits it through the second transmission mechanism 15 to the second wheel 17.

The step board 11 is provided with a handle 19 through a stay 18.

The rider grips the handle 19 by his or her two hands at the time of riding.

The step board 11 is provided with a sensor group 20 such as an inclination sensor for detection of an inclination of the step board 11 with respect to the horizontal direction.

Next, the mechanical action at the time of use of the two-wheeled vehicle 10 will be explained.

The rider places both feet on the step board 11.

The two-wheeled vehicle 10 contacts the road surface 30 at the contact points 35 and 36 with the first wheel 16 and second wheel 17. When the center of gravity of the rider moves, the step board 11 inclines in the + and − directions about the vehicle shaft in accordance with the same.

In the present embodiment, the inclination in the + direction of the step board 11 means the side of the step board 11 in the direction of progress rises in the upper direction in the figure in FIG. 1A. Inclination in the 31 direction means the portion in the opposite direction to the direction of progress of the step board 11 rises in the upper direction in the figure.

The sensor group 20 detects the inclination angle θ of the step board 11 with respect to the horizontal direction.

Figure 2:
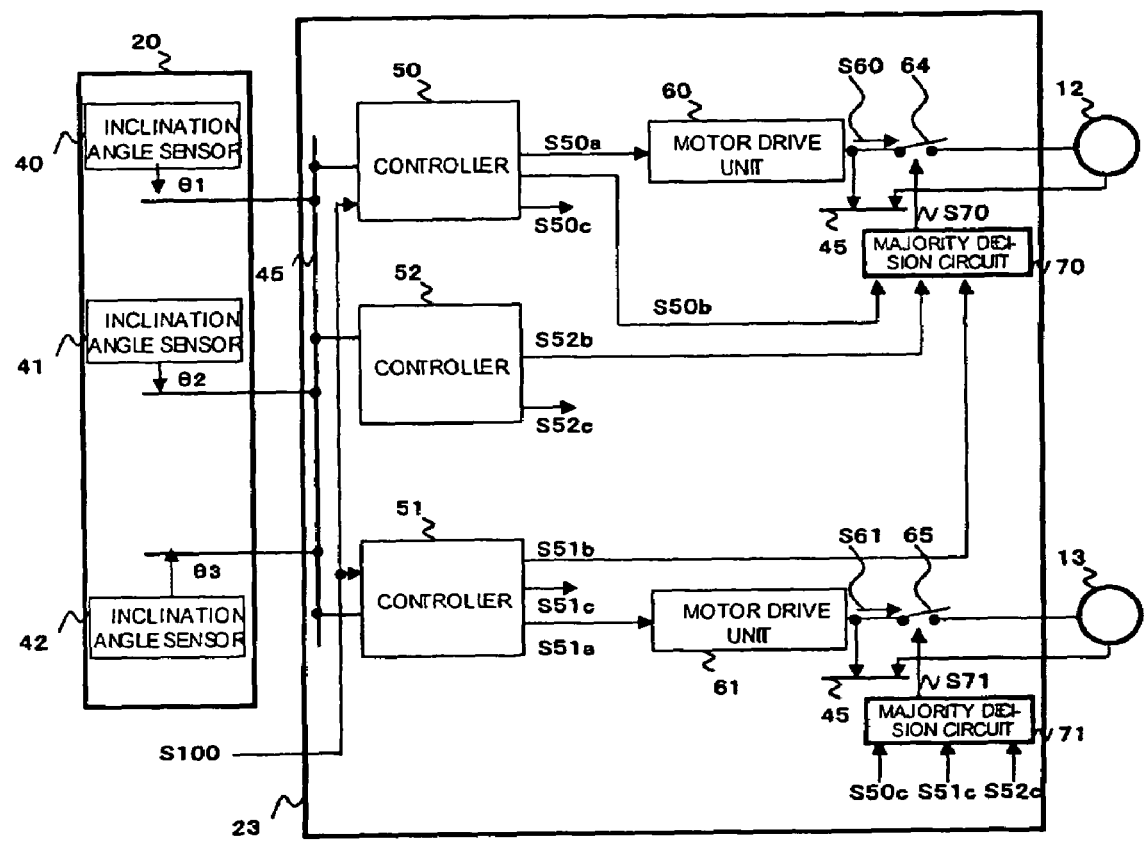
FIG. 2 is a view of the configuration of a drive unit shown in FIG. 1.

The sensor group 20, for example, as shown in FIG. 2, has three inclination angle sensors 40, 41, and 42.

The inclination angle sensors 40, 41, and 42 detect the inclination angle θ of the step board 11 with respect to the horizontal direction.

The angle θ1 detected by the inclination angle sensor 40, the angle θ2 detected by the inclination angle sensor 41, and the angle θ3 detected by the inclination angle sensor 42 are output to a bus 45.

The inclination angle sensors 40, 41, and 42 are for example provided with gyros or rigidity weights with centers of gravity offset from the rotational axis of a rotating variable resistor changing in resistance value in accordance with the rotational angle.

Further, the respective inclination angle sensors 40, 41, and 42 may be sensors of the same configuration or may be sensors of different configurations. There is no restriction on the mounting positions on the step board 11.

In a state where the first wheel 16 and the second wheel 17 are not turning, there is no stable point other than when the inclination angle θ is zero. However, the stable point is an unstable equilibrium point, so if the inclination angle θ is off from zero even a little, the step board 11 turns about the shaft until contacting the road surface.

Next, when the first wheel 16 and the second wheel 17 are driven to rotate by the first motor 12 and the second motor 13, both the rotor and the stator forming the motor rotate relatively with respect to one another.

In a rotational rotor type motor, the stator forms part of the outside covering the stator, the outer circumference is secured to the step board 11, and rotation of the motor occurs as relative motion with respect to the outer circumference.

Therefore, when a load is coupled with the shaft of the motor, a motor reaction force making the step board 11 incline in the + or − direction arises in accordance with the magnitude of the load.

The magnitude of the load at this time is the value of the rolling friction when the first wheel 16 and second wheel 17 roll on the road surface 30 converted at the shafts of the first motor 12 and second motor 13.

The step board 11 is comprised by a single high rigidity plate, so the motor reaction force acting on the step board 11 becomes the combined force of the motor reaction forces of the first motor 12 and second motor 13.

On the other hand, if the rider riding on the step board 11 changes the position of his or her center of gravity, a large rotational force corresponding to the product of the distance of the line connecting the center of gravity position and the vehicle shaft (axis of center of gravity) and the component orthogonal to the axis of the center of gravity of the acceleration of gravity occurs at the step board 11 around the vehicle shaft.

When the motor reaction force is equal to the magnitude of that rotational force, the inclination angle θ of the step board 11 is maintained, so the step board 11 does not contact the road surface. Further, the first motor 12 and the second motor 13 continue to rotate, so the two-wheeled vehicle 10 continues to move.

If the first motor 12 and the second motor 13 rotate in a direction by which the two-wheeled vehicle 10 moves in the direction of progress, the torque reaction acts in a direction increasing the inclination θ of the step board 11.

Further, the inclination angle θ of the step board 11 continues to increase in the positive direction and finally the step board 11 and the road surface 30 come into contact. Here, if detecting the inclination angle θ of the step board 11 by the sensor group 20 and making adjustments to weaken the torque reactions of the first motor 12 and second motor 13, the inclination angle θ of the step board 11 is reduced.

Conversely, when the inclination angle θ of the step board 11 is negative, if there is no change in the torques of the first motor 12 and second motor 13, the inclination angle θ of the step board 11 continues to increase in the negative direction. Finally, the step board 11 and the road surface 30 come into contact.

Here, if the torques of the first motor 12 and the second motor 13 increase, the torque reaction also increases and the inclination angle θ of the step board 11 decreases. Raising the torques of the first motor 12 and second motor 13 raises the speed of the motors, so the speeds of the first wheel 16 and the second wheel 17 also rise and the running acceleration of the two-wheeled vehicle 10 becomes faster.

In the present embodiment, the drive unit 23 holds a posture stabilizing the two-wheeled vehicle 10 by controlling the torques of the first motor 12 and second motor 13 based on the inclination angle θ of the step board 11.

Next, the drive unit 23 shown in FIG. 1 will be explained in detail.

FIG. 2 is a view of the configuration of the drive unit 23 shown in FIG. 1.

Figure 3:
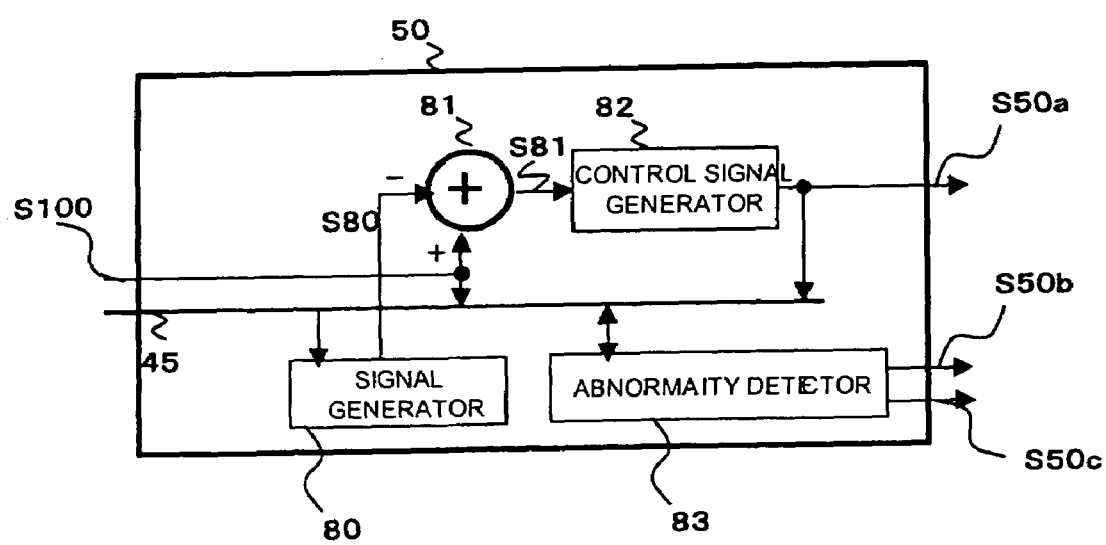
FIG. 3 is a view of the configuration of a sensor group and controller shown in FIG. 2.
Figure 4:
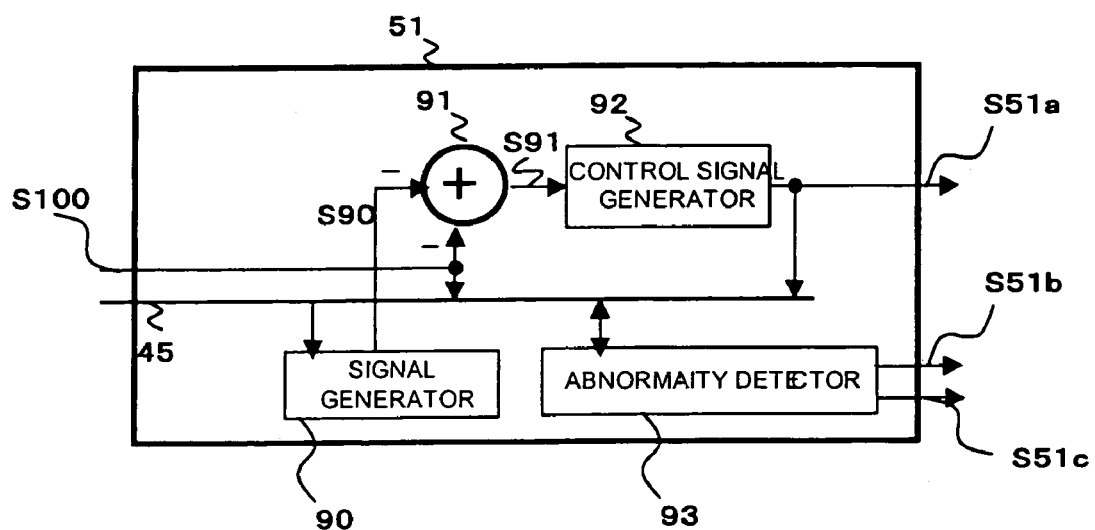
FIG. 4 is a view of the configuration of another controller shown in FIG. 2.
Figure 5:
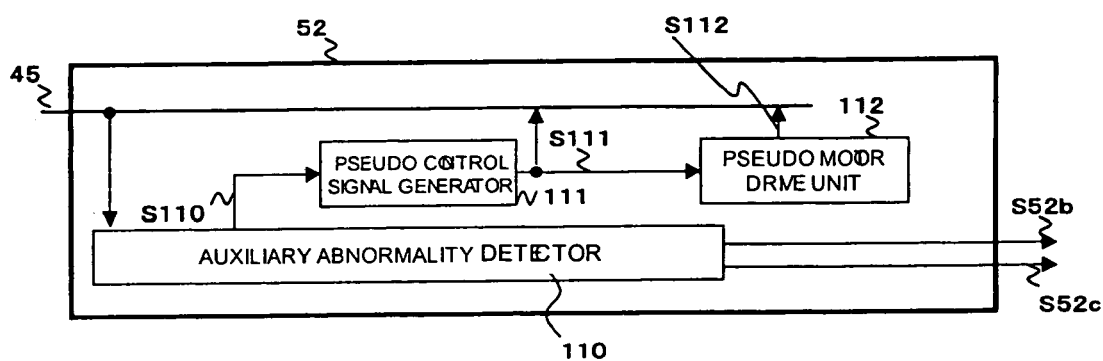
FIG. 5 is a view of the configuration of still another controller shown in FIG. 2.

FIG. 3 is a view of the configuration of the controller 50 shown in FIG. 2, FIG. 4 is a view of the configuration of the controller 51 shown in FIG. 2, and FIG. 5 is a view of the configuration of the controller 52 shown in FIG. 2.

As shown in FIG. 2, the drive unit 23 for example has controllers 50, 51, and 52, motor drive units 60 and 61, switches 64 and 65, and majority decision circuits 70 and 71.

Here, the controllers 50, 51, and 52 correspond to the abnormality detecting means of the present invention, the majority decision circuits 70 and 71 correspond to the majority decision means of the present invention, and the switches 64 and 65 correspond to the drive stopping means of the present invention.

The controllers 50, 51, and 52 are configured by, for example, digital signal processors (DSPs), microprocessor units (MPUs), dedicated hardware, etc.

In the present embodiment, the control signal generator 82 shown in FIG. 3, the control signal generator 92 shown in FIG. 4, and the pseudo control signal generator 11 shown in FIG. 5 have the same operating characteristics.

Further, the motor drive unit 60 and motor drive unit 61 shown in FIG. 2 and the pseudo motor drive unit 112 shown in FIG. 5 have the same operating characteristics.

First, the drive system of the first motor 12 will be explained.

The drive system of the first motor 12 is for example configured by a controller 50, a motor drive unit 60, a switch 64, and a majority decision circuit 70.

The controller 50, as shown in FIG. 3, for example has a signal generator 80, a processor 81, a control signal generator 82, and an abnormality detector 83.

The signal generator 80 receives as input signals that carry values for the inclination angles θ1, θ2, and θ3 from the inclination angle sensors 40, 41, and 42 shown in FIG. 2, generates a control signal (error signal) S80 based on the average value of these inclination angles or a single predetermined inclination angle, and outputs the same to the processor 81.

Here, the inclination angles θ1, θ2, and θ3 substantially fall in the range of detection accuracy of the inclination angle sensors 40, 41, and 42.

The processor 81 subtracts the control signal S80 from a rotation signal S100 corresponding to the operation of the handle 19 etc. by the rider (corresponding to designated rotation of vehicle body in the present invention) to generate the control signal S81 and outputs this control signal S81 to the control signal generator 82.

Here, when the rotation signal S100 indicates a rotation angle 0°, the control signal S81 matches the control signal S80.

The rotation signal S100 is a signal for rotation differing in speeds of the first wheel 16 and second wheel 17 in the running state of the two-wheeled vehicle 10. When generating the later explained control signal, this is added positively at the controller 50 and added negatively at the controller 51. Due to this, the two-wheeled vehicle 10 is made to operate by different speeds of the left and right wheels while making the motor reaction force a predetermined value.

Note that the control signals S81, S91, and S111 of the controllers 50, 51, and 52 may also be generated based on the data showing the state of the two-wheeled vehicle 10 of other than the inclination angle of the step board 11.

The control signal generator 82 applies phase compensation and gain control to the control signal S81 input from the processor 81 to generate the control signal S50a and outputs this to the motor drive unit 60.

The abnormality detector 83 generates an abnormality detection signal S50b showing detection of an abnormality relating to the drive system of the first motor 12 and an abnormality detection signal S50c showing detection of an abnormality relating to the drive system of the second motor 13 based on the inclination angles θ1, θ2, and θ3 from the inclination angle sensors 40, 41, and 42, the rotation signal S100, the control signal S50a, the control signal S51a from the controller 51, the control signal S112 from the controller 52, the motor drive signal S60 from the motor drive unit 60, and the motor drive signal S61 from the motor drive unit 61 input through the bus 45. The specific processing performed by the abnormality detector 83 will be explained later in detail.

The abnormality detector 83 outputs the abnormality detection signal S50b to the majority decision circuit 70 and outputs the abnormality detection signal S50c to the majority decision circuit 71.

The motor drive unit 60 is for example a power amplifier and for example amplifies the control signal S50a from the controller 50 to generate a motor drive signal S60 and outputs this to the bus 45 and switch 64.

Here, the motor drive signal S60 is a power signal for turning the first motor 12. The first motor 12 turns based on the motor drive signal S60 to generate the motor reaction force. A reaction force combined with the reaction force of the motor of the second motor 13 occurs at the step board 11, whereby the step board 11 inclines with respect to the horizontal direction.

The inclination angle sensors 40, 41, and 42 detect the inclination.

The switch 64 is interposed between the motor drive unit 60 and the first motor 12 and turns on/off based on a switching signal S70 from the majority decision circuit 70.

The majority decision circuit 70 outputs to the switch 64 a switching signal S70 indicating "on" when at least two abnormality detection signals out of these abnormality detection signals indicate an abnormality and outputs to the switch 64 a switching signal S70 indicating "off" when at least two abnormality detection signals indicate normality by a majority decision based on the abnormality detection signal S50b from the controller 50, the abnormality detection signal S51b from the controller 51, and the abnormality detection signal S52b from the controller 52.

Next, the drive system of the second motor 13 will be explained.

The drive system of the second motor 13 is configured by a controller 51, a motor drive unit 61, a switch 65, and a majority decision circuit 71.

The controller 51, as shown in FIG. 4, for example has a signal generator 90, a processor 91, a control signal generator 92, and an abnormality detector 93.

The signal generator 90 receives input signals that carry values for the inclination angles $\theta 1$, $\theta 2$, and $\theta 3$ from the inclination angle sensors 40, 41, and 42 shown in FIG. 2, generates a control signal S90 based on the average value of these inclination angles or a single predetermined inclination angle, and outputs the same to the processor 91.

The processor 91 adds to the control signal S90 reversed in sign a signal of the rotation signal S100 reversed in sign to generate the control signal S91 and outputs this to the control signal generator 92.

Here, when the rotation signal S100 indicates a rotation angle 0°, the control signal S91 matches the control signal S90.

The control signal generator 92 applies phase compensation and gain control to the control signal S91 input from the processor 91 to generate the control signal S51a and outputs this to the motor drive unit 61.

The abnormality detector 93 generates an abnormality detection signal S51b showing detection of an abnormality relating to the drive system of the first motor 12 and an abnormality detection signal S51c showing detection of an abnormality relating to the drive system of the second motor 13 based on the inclination angles $\theta 1$, $\theta 2$, and $\theta 3$ from the inclination angle sensors 40, 41, and 42, the rotation signal S100, the control signal S51a, the control signal S50a from the controller 50, the control signal S112 from the controller 52, the motor drive signal S60 from the motor drive unit 60, and the motor drive signal S61 from the motor drive unit 61 input through the bus 45. The processing performed by the abnormality detector 93 will be explained later in detail.

The abnormality detector 93 outputs the abnormality detection signal S51b to the majority decision circuit 70 and outputs the abnormality detection signal S51c to the majority decision circuit 71.

The motor drive unit 61 is for example a power amplifier and for example amplifies the control signal S51a from the controller 51 to generate a motor drive signal S61 and outputs this to the bus 45 and switch 65.

Here, the motor drive signal S61 is a power signal for turning the second motor 13. The second motor 13 turns based on the motor drive signal S61 to generate the motor reaction force. As explained earlier, a reaction force combined with the reaction force of the motor of the first motor 12 occurs at the step board 11, whereby the step board 11 inclines with respect to the horizontal direction.

The switch 65 is interposed between the motor drive unit 61 and the second motor 13 and turns on/off based on a switching signal S71 from the majority decision circuit 71.

The majority decision circuit 71 outputs to the switch 65 a switching signal S71 indicating "off" when at least two abnormality detection signals out of these abnormality detection signals indicate an abnormality and outputs to the switch 65 a switching signal S71 indicating "on" when at least two abnormality detection signals indicate normality by a majority decision based on the abnormality detection signal S50c from the controller 50, the abnormality detection signal S51c from the controller 51, and the abnormality detection signal S52c from the controller 53.

Next, the controller 52 will be explained.

The controller 52, as shown in FIG. 5, has a supplementary (or auxiliary) abnormality detector 110, a pseudo control signal generator 111, and a pseudo motor drive unit 112.

The auxiliary abnormality detector 110 receives as input the inclination angles $\theta 1$, $\theta 2$, and $\theta 3$ from the inclination angle sensors 40, 41, and 42 shown in FIG. 2 through the bus 45, generates a pseudo control signal S110 based on the average value of these inclination angles or a single predetermined inclination angle, and outputs this to the pseudo control signal generator 111.

The pseudo control signal generator 111 applies phase compensation and gain control to the pseudo control signal S110 input from the auxiliary abnormality detector 110 to generate the pseudo control signal S111 and outputs this to the bus 45 and the pseudo motor drive unit 112.

The processing of the pseudo control signal generator 111 for example is the same as the control signal generator 82 shown in FIG. 3 and the control signal generator 92 shown in FIG. 4.

The pseudo motor drive unit 112 for example is a power amplifier. It amplifies the pseudo control signal S111 input from the pseudo control signal generator 111 to generate a pseudo motor drive signal S112 and outputs this to the bus 45.

That is, the pseudo motor drive signal S112 is not output to the first motor 12 and the second motor 13.

The pseudo motor drive unit 112 is the same as the motor drive unit 60 and the motor drive unit 61 shown in FIG. 2.

Further, the above-mentioned auxiliary detector 110 generates an abnormality detection signal S61 showing detection of an abnormality relating to the drive system of the first motor 12 and an abnormality detection signal S52c showing detection of an abnormality relating to the drive system of the second motor 13 based on the inclination angles $\theta 1$, $\theta 2$, and $\theta 3$ from the inclination angle sensors 40, 41, and 42, the rotation signal S100, the control signal S50a from the controller 50, the control signal S51a from the controller 51, the pseudo control signal S112 from the pseudo motor drive unit 112, the motor drive signal S60 from the motor drive unit 60, and the motor drive signal S61 from the motor drive unit 61 input through the bus 45.

The processing performed by the auxiliary abnormality detector 110 will be explained in detail later.

The auxiliary abnormality detector 110 outputs the abnormality detection signal S52b to the majority decision circuit 70 and outputs the abnormality detection signal S52c to the majority decision circuit 71.

As explained above, the controllers 50, 51, and 52 are connected through the bus 45 for transfer of signals.

Note that when the abnormality detectors 83 and 93 and the auxiliary abnormality detector 110 detect a predetermined abnormal state, the alarm unit 22 outputs an alarm by a not shown speaker, light emitting lamp, or vibrator attached to the handle so as to draw attention to the alarm by sound, sight, or touch.

Next, examples of operation of the two-wheeled vehicle 10 will be explained focusing on the operation of the drive unit 23.

[First Example of Operation]

In this example of operation, an explanation will be made of the case of all of the drive system of the first motor 12, the drive system of the second motor 13, and the controller 52 operating normally.

In this case, the abnormality detector 83 shown in FIG. 3 judges that the normal control signal S50a from the control signal generator 82, the normal control signal S51a from the control signal generator 92 shown in FIG. 4, and the normal pseudo control signal S111 from the controller 52 match in a predetermined range of allowance when eliminating the effects of the rotation signal S100.

Further, the abnormality detector 83 judges that the normal motor drive signal S60 from the motor drive unit 60, the normal motor drive signal S61 from the motor drive unit 61, and the pseudo motor drive signal S112 from the pseudo motor drive unit 112 shown in FIG. 5 match in a predetermined allowable range when eliminating the effects of the rotation signal S100 (effect due to difference in drive force occurring between first motor 12 and second motor 13 due to the rotation signal S100).

Further, the abnormality detector 83 outputs an abnormality detection signal S50b indicating normality to the majority decision circuit 70 and outputs an abnormality detection signal S50c indicating normality to the majority decision circuit 71.

Further, the abnormality detector 93 shown in FIG. 4 also performs a similar operation to the abnormality detector 83, outputs an abnormality detection signal S51b indicating normality to the majority decision circuit 70, and outputs an abnormality detection signal S51c indicating normality to the majority decision circuit 71.

Further, the auxiliary abnormality detector 110 shown in FIG. 5 also performs a similar operation to the abnormality detector 83, outputs an abnormality detection signal S52b indicating normality to the majority decision circuit 70, and outputs an abnormality detection signal S52c indicating normality to the majority decision circuit 71.

Due to this, the majority decision circuit 70 outputs a switching signal S70 indicating "on" to the switch 64, the motor drive signal S60 from the motor drive unit 60 is supplied to the first motor 12, and the first motor 12 is driven to rotate.

Further, in the same way, the majority decision circuit 71 outputs a switching signal S71 indicating "on" to the switch 65, the motor drive signal S61 from the motor drive unit 61 is supplied to the second motor 13, and the second motor 13 is driven to rotate.

[Second Example of Operation]

In this example of operation, for example, the explanation will be given of the case where an abnormality occurs in the pseudo control signal generator 111.

In this case, the abnormal pseudo control signal S111 and the pseudo motor drive signal S112 are output through the bus 45 to the abnormality detector 83, abnormality detector 93, and auxiliary abnormality detector 110.

The abnormality detector 83 shown in FIG. 3 outputs an abnormality detection signal S50b indicating normality to the majority decision circuit 70 and outputs an abnormality detection signal S50c indicating normality to the majority decision circuit 71.

Further, the abnormality detector 93 shown in FIG. 4 outputs an abnormality detection signal S51b indicating normality to the majority decision circuit 70 and outputs an abnormality detection signal S51c indicating normality to the majority decision circuit 71.

Further, the auxiliary abnormality detector 110 shown in FIG. 5 outputs an abnormality detection signal S52b indicating normality to the majority decision circuit 70 and outputs an abnormality detection signal S52c indicating normality to the majority decision circuit 71.

Due to this, the majority decision circuit 70 outputs a switching signal S70 indicating "on" to the switch 64, the motor drive signal S60 from the motor drive unit 60 is supplied to the first motor 12, and the first motor 12 is driven to rotate.

Further, in the same way, the majority decision circuit 71 outputs a switching signal S71 indicating "on" to the switch 65, the motor drive signal S61 from the motor drive unit 61 is supplied to the second motor 13, and the second motor 13 is driven to rotate. Further, the abnormality detector 83, the abnormality detector 93, and the auxiliary abnormality detector 110 make the alarm unit 22 output an alarm.

Due to this, the rider learns that some sort of abnormality has occurred based on the alarm output of the alarm unit 22 and stops the two-wheeled vehicle 10 in accordance with need.

[Third Example of Operation]

In this example of operation, for example, the explanation will be given of the case where an abnormality occurs in the control signal generator 82 shown in FIG. 3.

In this case, the abnormal control signal S50a is output via the bus 45 to the abnormality detector 83, the abnormality detector 93, and the auxiliary abnormality detector 110.

Due to this, the abnormality detectors 83 and 93 and the auxiliary abnormality detector 110 output abnormality detection signals S50b, S51b, and S52b showing abnormality to the majority decision circuit 70 and output abnormality detection signals S50c, S51c, and S52c showing normality to the majority decision circuit 71.

Due to this, the switching signal S70 from the majority decision circuit 70 indicates "off", the switch 64 turns off, and the drive action of the first motor 12 is stopped. When the drive action of the first motor 12 is stopped, the first motor 12 rotates freely due to inertia. In this case, the two-wheeled vehicle 10 stops in for example about 2 to 6 seconds.

On the other hand, the switching signal S71 from the majority decision circuit 71 indicates "on", the switch 65 turns off, and the second motor 13 continues to drive rotation.

Note that when an abnormality occurs in the motor drive unit 60 as well, an operation similar to the operation explained above is performed.

Further, when an abnormality occurs in the control signal generator 92 or the motor drive unit 61, the abnormality detectors 83 and 93 and the auxiliary abnormality detector 110 output abnormality detection signals S50b, S51b, and S52b indicating normality to the majority decision circuit 70, while the outputs abnormality detection signals S50c, S51c, and S52c indicating abnormality to the majority decision circuit 71.

Due to this, the first motor 12 continues to drive rotation, while the drive of rotation by the second motor 13 is stopped.

Further, the abnormality detector 83, the abnormality detector 93, and the auxiliary abnormality detector 110 make the alarm unit 22 output an alarm.

[Fourth Example of Operation]

In this example of operation, for example, the explanation will be given of the case where an abnormality occurs in the abnormality detector 83 shown in FIG. 3, only the abnormality detection signal S50b indicates an abnormality, and the other abnormality detection signals S51b and S52b indicate normality.

In this case, a switching signal S70 indicating "on" is output to the switch 64 by a majority decision at the majority decision circuit 70, and a motor drive signal S60 is supplied to the first motor 12.

Due to this, the first motor 12 continues to drive rotation.

Further, the abnormality detector 93 and the auxiliary abnormality detector 110 make the alarm unit 22 output an alarm.

The same is true when an abnormality occurs in the abnormality detector 93 and the auxiliary abnormality detector 110.

Note that when an abnormality occurs in the abnormality detector 83, only the abnormality detection signal S50b indicates normality, and the other abnormality detection signals S51b and S52b indicate abnormality, a switching signal S70 indicating "off" is output to the switch 64 by majority decision of the majority decision circuit 70 and the drive of rotation by the first motor 12 is stopped.

[Fifth Example of Operation]

The abnormality detectors 83 and 93 and the auxiliary abnormality detector 110 judges whether all of the inclination angles θ1, θ2, and θ3 from the inclination angle sensors 40, 41, and 42 are in a predetermined range within the sensor accuracy.

The abnormality detectors 83 and 93 and the auxiliary abnormality detector 110 make the alarm unit 22 output an alarm when there is an inclination angle outside the sensor accuracy in the inclination angles θ1, θ2, and θ3.

Further, the signal generators 80, 90, and 110 generate the control signals S80, S90, and S110 based on the average value of the two inclination angles within the sensor accuracy when there is one inclination angle outside the sensor accuracy.

[Sixth Example of Operation]

For example, it is also possible to provide each of the first wheel 16 and second wheel 17 with a rotation detecting means for detecting a rotational signal indicating the actual rotational speed and detect the abnormalities in the first motor 12 and second motor 12 based on the rotational signal detected by the rotation detecting means and the motor drive signals S60 and S61.

In this case as well, at least three abnormality detection systems are provided and abnormalities in the first motor 12 and second motor 13 are detected by majority decision of the same.

Further, the switches 64 and 65 corresponding to the first motor 12 and the second motor 13 for which abnormalities are detected are turned off and an alarm is output from the alarm unit 22.

Further, the abnormality detector 83 etc. may judge the road conditions etc. based on the rotation signal detected by the rotation detecting means and the motor drive signals S60 and S61 and make the alarm unit 22 output an alarm in accordance with need.

As explained above, according to the two-wheeled vehicle 10, in the drive unit 23 shown in FIG. 2, the controllers 50, 51, and 52 detect operational abnormalities in the drive system of the first motor 12 and the drive system of the second motor 13 and use the detection results for majority decision by the majority decision circuits 70 and 71 to determine whether to turn the switches 64 and 65 on/off.

Due to this, even when an abnormality occurs in a single one of the controllers 50, 51, and 52, the drive actions of the first motor 12 and the second motor 13 are suitably controlled on/off based on the abnormality detection signals from the normal controllers and the posture of the two-wheeled vehicle 10 can be held in a stabilized state.

Further, in the two-wheeled vehicle 10, the controllers 50, 51, and 52 can suitably detect abnormalities in the drive systems by using control signals and motor drive signals generated in the same way in the controller 52 in addition to the control signals and motor drive signals used for the drive actions of the first motor 12 and second motor 13.

Further, according to the two-wheeled vehicle 10, since there are no auxiliary wheels, it is possible to operate (run) the two-wheeled vehicle small in size and superior in mobility.

The present invention is not limited to the above embodiment.

In the above embodiment, the case of using three systems as the odd number of systems of the present invention was illustrated, but it is also possible to detect operational abnormalities by an odd number of five or more systems.

In the above embodiment, the case was shown of generating a single third drive signal of the present invention, but it is also possible to provide three or a higher odd number of controllers 52 to generate a plurality of third drive signals.

Summarizing the effects of the invention, according to the invention, it is possible to provide a drive control apparatus and method enabling an autonomously stabilized posture to be held by a small sized configuration and a two-wheeled vehicle using the same.

The present disclosure contains subject matter related to that disclosed in Japanese priority document JP2002-379901, filed in the JPO on Dec. 27, 2002, the entire contents of which being incorporated herein by reference.

While the invention has been described with reference to specific embodiments chosen for purpose of illustration, it should be apparent that numerous modifications could be made thereto by those skilled in the art without departing from the basic concept and scope of the invention.

What is claimed is:

1. A two-wheeled vehicle comprising:
a first wheel and a second wheel configured to rotate about shafts orthogonal to a direction of progression,
a first drive mechanism configured to drive said first wheel, a second drive mechanism configured to drive said second wheel, an abnormality detecting mechanism configured to detect operational abnormalities of said first drive mechanism and said second drive mechanism by an odd number of at least three independent detection systems, a majority decision mechanism configured to detect abnormalities in said first drive mechanism and said second drive mechanism by majority decision based on detection results of detection of operational abnormalities by said abnormality detecting mechanism by said odd number of independent detection systems, and a drive stopping mechanism configured to stop a drive action of at least one of said first drive mechanism and said second drive mechanism when an abnormality is detected by said majority decision mechanism.

2. The two wheel vehicle as set forth in claim 1, further having an alarm outputting mechanism configured to output an alarm when an abnormality is detected by said majority decision mechanism.

3. The two wheel vehicle as set forth in claim 1, wherein:
said first drive mechanism and said second drive mechanism generate a first drive signal for driving said first wheel and a second drive signal for driving said second wheel based on at least one of a state of said vehicle and a control instruction, said drive control apparatus further has a third drive mechanism configured to generate a third drive signal for judgment of abnormalities corresponding to said first drive signal and said second drive signal based on at least one of the state of said vehicle and said control instruction, and said abnormality detecting mechanism is configured to detect operational abnormalities of said first drive mechanism and said second drive mechanism based on matching of said first drive signal, said second drive signal, and said third drive signal at each of said independent detection systems.

4. The two wheel vehicle as set forth in claim 3, wherein:
said first drive mechanism and said second drive mechanism generate said first drive signal and said second drive signal so that a designated difference corresponding to a rotational speed of said vehicle arises in drive forces given to said first wheel and said second wheel, and said abnormality detecting mechanism being configured to detect operational abnormalities in said first drive mechanism and said second drive mechanism based on coincidence and noncoincidence between said first drive signal and said second drive signal minus effects due to said difference and said third drive signal.

5. A two-wheeled vehicle having:
a first wheel and a second wheel configured to rotate about shafts orthogonal to a direction of progression;
a first drive means for driving said first wheel;
a second drive means for driving said second wheel; an abnormality detecting means for detecting operational abnormalities of said first drive means and said second drive means by an odd number of at least three independent detection systems;
a majority decision means for detecting abnormalities in said first drive means and said second drive means by majority decision based on detection results of detection of operational abnormalities by said abnormality detecting means by said odd number of detection systems; and
a drive stopping means for stopping said drive action of a wheel by a drive means for which an abnormality is detected by said majority decision means among said first drive means and said second drive means.

6. The two wheel vehicle as set forth in claim 5, wherein:
said first drive means and said second drive means generate a first drive signal for driving said first wheel and a second drive signal for driving said second wheel based on the state of said vehicle or an instruction;

said drive control apparatus further has a third drive means for generating a third drive signal for judgment of abnormalities corresponding to said first drive signal and said second drive signal based on at least one of a state of said vehicle and a control instruction; and said abnormality detecting means detects operational abnormalities of said first drive means and said second drive means based on matching of said first drive signal, said second drive signal, and said third drive signal at each of said independent systems.

7. The two wheel vehicle as set forth in claim 6, wherein:
said first drive means and said second drive means generate said first drive signal and said second drive signal so that a designated difference corresponding to a rotational speed of said vehicle arises in drive forces given to said first wheel and said second wheel; and said abnormality detecting means detects operational abnormalities in said first drive means and said second drive means based on coincidence and noncoincidence between said first drive signal and said second drive signal minus effects due to said difference and said third drive signal.

8. The two wheel vehicle as set forth in claim 5, further having an alarm outputting means for outputting an alarm when an abnormality is detected by said majority decision means.

* * * * *